(12) United States Patent
Swope et al.

(10) Patent No.: US 6,829,558 B2
(45) Date of Patent: Dec. 7, 2004

(54) METHOD FOR REDUCING POSITION UNCERTAINTY OF A PORTABLE INERTIAL NAVIGATION DEVICE

(75) Inventors: Charles B. Swope, Coral Springs, FL (US); Chet A. Lampert, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 194 days.

(21) Appl. No.: 10/185,996

(22) Filed: Jun. 27, 2002

(65) Prior Publication Data

US 2004/0002828 A1 Jan. 1, 2004

(51) Int. Cl.$^7$ .................. G01C 17/00; G01C 19/00; G01C 9/00; G06F 15/00

(52) U.S. Cl. .................. 702/151; 701/25; 701/220; 701/213; 342/357.05; 342/357.06; 342/357.15; 340/995.22

(58) Field of Search ................ 702/151; 701/25, 701/220, 213; 342/357.06, 357.05, 357.15; 340/995.22

(56) References Cited

U.S. PATENT DOCUMENTS

| | | | | |
|---|---|---|---|---|
| 4,866,617 A | * | 9/1989 | Matsuda et al. | 701/25 |
| 5,170,165 A | * | 12/1992 | Iihoshi et al. | 340/995.22 |
| 6,064,942 A | * | 5/2000 | Johnson et al. | 701/213 |
| 6,081,230 A | * | 6/2000 | Hoshino et al. | 342/357.06 |
| 6,317,077 B1 | * | 11/2001 | Soleimani et al. | 342/357.05 |
| 2003/0112179 A1 | * | 6/2003 | Gronemeyer | 342/357.15 |
| 2003/0216865 A1 | * | 11/2003 | Riewe et al. | 701/220 |

\* cited by examiner

*Primary Examiner*—Bryan Bui
*Assistant Examiner*—Aditya S Bhat
(74) *Attorney, Agent, or Firm*—Terri S. Hughes; Barbara R. Dautre

(57) ABSTRACT

A first set of coordinates (100) of a device and an estimated positional error ("EPE") radius (102) is measured. An EPE circle (104) is derived, in which the device is approximately located, from the first set of coordinates (100) and the EPE radius (102). When it is determined that the EPE radius (102) exceeds a predetermined threshold, a first range (106) between the device and a ranging site (108) is measured, and a locus of points (110) on and within the EPE circle (104) is determined, wherein a distance between the ranging site (108) and each point in the locus of points (110) approximately equals the first range (106).

29 Claims, 1 Drawing Sheet

METHOD FOR REDUCING POSITION UNCERTAINTY OF A PORTABLE INERTIAL NAVIGATION DEVICE

REFERENCE TO RELATED APPLICATIONS

The present application is related to the following U.S. applications commonly owned together with this application by Motorola, Inc.:

Ser. No. 10/078,796, filed Feb. 19, 2002, titled "Method Of Increasing Location Accuracy In An Inertial Navigational Device" by Swope et al. (attorney docket no. CM03612J);

Ser. No. 10/078,738, filed Feb. 19, 2002, titled "Device For Use With A Portable Inertial Navigation System (PINS) and Method For Processing PINS Signals" by Swope et al. (attorney docket no. CM03613J);

Ser. No. 10/100,640, filed Mar. 19, 2002, titled "Device For Use With A Portable Inertial Navigation System ("PINS") and Methods for Transitioning Between Location Technologies" by Swope et al. (attorney docket no. CM03629J); and Ser. No. 10/101,132, filed Mar. 19, 2002, titled "Device For Use With A Portable Inertial Navigation System ("PINS") and Methods for Transitioning Between Location Technologies" by Lampert et al. (attorney docket no. CM03630J).

FIELD OF THE INVENTION

The present invention relates generally to a method for reducing position uncertainty of a portable inertial navigation device.

BACKGROUND OF THE INVENTION

A device used in a portable inertial navigation system ("PINS device") utilizes accelerometers, gyroscopes, and support electronics, such as a processor, in order to determine motion changes. These motion changes are then translated to a position based on a reference position and the integration or differentiation of the motion changes. As time progresses, the errors associated with the accelerometers and gyroscopes increases to a point where the PINS device provides a location of the user that is outside of the required positional resolution, thus rendering the device ineffective or lost.

Resolving this problem can take on many forms. One solution is to add beacons in the building, which allows for updates at specific locations. A problem with this solution is every building entered must be retrofitted in order to receive those updates.

Another solution common in the field is the use of triangulation using three or more radio frequency ("RF") links. The problem with this solution is that the multi-path has a tendency to reduce resolution to unacceptable levels for in-building solutions.

Thus, there exists a need for ensuring that the required positional resolution is maintained for an indefinite period of time, without the need to recapture global positioning system ("GPS") signals or the like.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

The present invention takes advantage of a single RF link and relative movement of the PINS user (radio user). Specifically, the use of a single site using ranging techniques, as commonly known in the art, determines the range to the PINS user. Those skilled in the art of range-finding can determine when a given range calculation is highly accurate.

Also known are the characteristics of the PINS device, which has highly accurate positional measurements for short periods of time. When a highly accurate range calculation is made, it can be used along with relative PINS movement information at significantly higher resolution to reduce the overall position uncertainty of the PINS device to within the required positional resolution.

Prior to entering a building, the PINS device typically has a positional fix using a secondary location technology, such as a GPS, which is typically highly accurate. Typically, when a PINS device enters the building or an area where GPS cannot be used, the estimated positional error ("EPE") reported by the PINS device will increase over time. The present invention reduces the EPE as reported by the PINS device.

Figure 1:
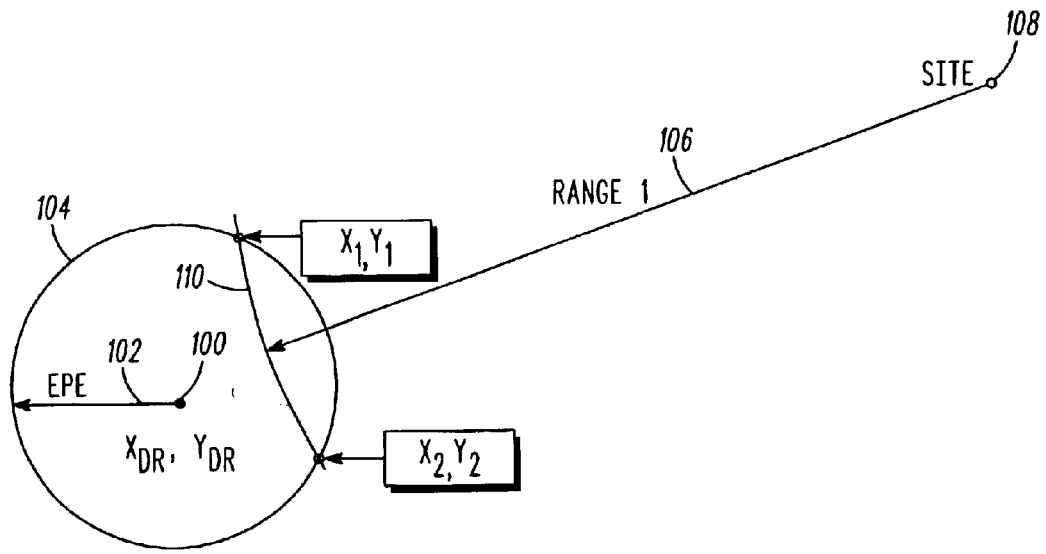
FIG. 1 illustrates the information that would be available after a highly accurate range measurement in accordance with the present invention.

As illustrated in FIG. 1, a first set of coordinates ($X_{DR}$, $Y_{DR}$) 100 and an EPE radius 102 is measured for the PINS device (not shown). If an EPE radius 102 is not provided, the PINS device can derive the EPE radius 102 from a confidence factor, or other suitable means. In the preferred embodiment of the present invention, the PINS device reports these measurements. Based on the first set of coordinates 100 and the EPE radius 102, an EPE circle 104 is derived. The EPE circle 104 represents an area in which the PINS device is approximately located. In the preferred embodiment, the first set of coordinates 100 is the center point of the EPE circle 104, however, it is not limited to such.

While the PINS device moves throughout the building or area, the PINS device monitors whether the EPE radius 102 exceeds a predetermined threshold. In the preferred embodiment of the present invention, the predetermined threshold is based on a positional resolution required by the PINS device, however, it is not limited to such. If the EPE radius 102 does not exceed the predetermined threshold, it is determined that the PINS device is approximately located within the EPE circle 104 and that this positional resolution of the location of the PINS device is accurate enough for the specific application. If, however, the EPE radius exceeds the predetermined threshold, it is determined that the position uncertainty of the PINS device is needs to be reduced.

Once determined that the EPE radius exceeds the predetermined threshold, the present invention reduces the position uncertainty of the PINS device by measuring a first range (Range 1) 106 between the actual location of the PINS device and a ranging site 108. In the preferred embodiment, a single ranging site 108 is used to obtain range measurements (e.g., Range 1) at certain points in time depending on the signal quality at particular locations throughout the building or area. Preferably, the ranging site 108 uses a spread spectrum solution, however, as will be obvious to those skilled in the art, many other ranging solutions may be used in conjunction with the present invention.

Once the distance of Range 1 is measured, a locus of points 110 on and within the EPE circle is determined. The distance between the ranging site and each point in the locus of points approximately equals the first range 106. The locus of points 100 generated between $X_1$, $Y_1$ and $X_2$, $Y_2$ represents a three-dimensional spherical coordinate system with the origin at the site intersecting a two-dimensional Cartesian plane represented by the EPE circle 104. Motion in the two-dimensional lane generates an unambiguous location based on the absolute measurement of the PINS device. Thus, as illustrated in FIG. 1, the approximate position of the user who is carrying the PINS device is somewhere on the locus of points 110, inside or on the EPE circle 104.

At this point, the present invention has reduced the position uncertainty of the PINS device from the somewhere in the entire EPE circle 104 to somewhere on the locus of points 110 on or inside the EPE circle 104. Depending on the application, it may be desired to further reduce the position uncertainty to an even higher level of position accuracy. Let us now turn our attention to FIG. 2 and the steps involved in further reducing the position uncertainty of the PINS device in accordance with the present invention. First, it must be determine that the user holding the PINS device has moved his/her location. Once the user of the PINS device is standing in a new location, the PINS device measures a second set of coordinates. The first set of coordinates is compared against the second set of coordinates to generate a delta set of coordinates 200; in other words, in a two-dimensional coordinate system, it is determined how far the PINS device moved in the x-direction (Delta X) and how far the PINS device moved in the y-direction (Delta Y) with respect to the first set of coordinates ($X_{DR}$, $Y_{DR}$). Once the delta set of coordinates (Delta X, Delta Y) 200 has been derived, a second range measurement 202 is taken a short time later between the actual location of the PINS device and the ranging site 108. It is preferable that this range measurement is taken a short time later because the present invention relies on the high levels of accuracy of the PINS device in the short term, however, this range measurement may be taken at any time. Once the distance between the PINS device and the ranging site 108 has been determined, the delta set of coordinates 200 are added to at least one point in the locus of points 110 until a distance between a resultant point and the ranging site 108 approximately equals the second range measurement 200. Once the distance between a resultant point and the ranging site 108 approximately equals the second range measurement 200, it is determined that the PINS device is approximately located at the resultant point ($X_E$, $Y_E$); this is because there is only one point in space that is Delta X and Delta Y away from the locus of points 110 of the first position and has a range to the ranging site 108 equal to the second range measurement 200.

Said another way, a point from the locus of points is chosen and Delta X and Delta Y are added to the point; if the distance between the point chosen and the ranging site 108 approximately equals the second range measurement 200 after Delta X and Delta Y have been added to the point, then the PINS device is approximately located at that point; if the distance between the point chosen and the ranging site 108 does not approximately equal the second range measurement 200 after Delta X and Delta Y have been added to the point, then a new point is chosen from the locus of points 110.

Figure 2:
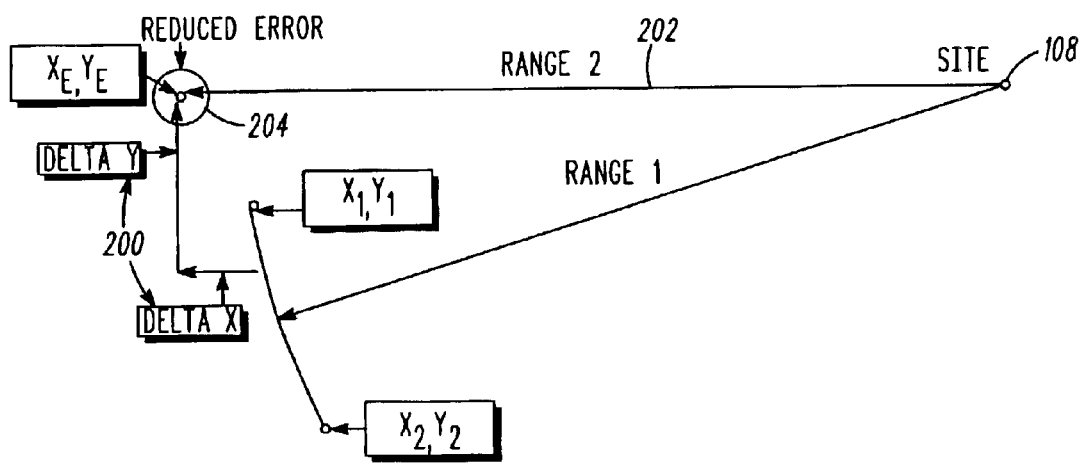
FIG. 2 illustrates the available information after movement of the PINS device and a second highly accurate range calculation in accordance with the present invention.

It is important to note that the range measurements described above has to be at a level that provided a reduced EPE as will be obvious to a person of ordinary skill in the art. It should also be noted that the points may be chosen from the locus of points 110 in a variety of fashions, such as, a binary search, a sequential search, a random search, or any other suitable technique or searching function. Further, it should be noted that a reduced error 204 is illustrated in FIG. 2 shows that measurement errors in ranging and short-term movement can be tolerated and will yield a reduced position uncertainty with a much reduced EPE. Thus the end user will have the positional accuracy desired.

An example of the reduction in the EPE, in accordance with the present invention, is illustrated mathematically below:

1. A user of the PINS/ranging device enters a structure and moves about for some time.
2. After some time, the PINS device reports a position that is outside of the needed accuracy.
3. A range measurement is made when possible. At this time, and example of what is known is:
   a) $X_{DR}$=30, $Y_{DR}$=100, EPE=25, Range 1=110
   b) The two points where the EPE circle meet Range 1 are: $X_1$=6.9913 (6.99133015) $Y_1$=109.7776 (109.77758330) and $X_2$=54.5912 (54.59123993) $Y_2$=95.4977 (95.49767448). These coordinates are found simply by finding the intersection of the EPE circle with the Range 1 arc.
4. A short time later (short because we are counting on the short term accuracy of the PINS device), a second range measurement is made. At that time, it is known that:
   a) Delta X=30, Delta Y=−30, Range 2=101

Since it is known that at the initial calculation that the PINS/range device was somewhere on the arc consisting of the locus of points between $X_1$, $Y_1$ and $X_2$, $Y_2$ at a distance of Range 1 from the ranging site. Using simple mathematics, it can be shown that the only point in space that is Delta X, Delta Y and Range 2 away from the locus of point $X_1$, $Y_1$ and $X_2$, $Y_2$ with Range 1 is:

$X_E$=70.5880 (70.58800983) $Y_E$=72.2380 (72.23802354)

This is because:

Range 2=square root $((X_E)^2+(Y_E)^2)$, and

Range 1=square root $((X_E-\text{Delta } X)^2+(Y_E-\text{Delta } Y)^2)$

To clarify the mathematics involved for calculating $X_E$ and $Y_E$ in the preferred embodiment, the following steps may be used:

1) Starting from either point at which the Range 1 Arc intersects the EPE circle (the two points to choose from are $X_1$, $Y_1$ or $X_2$, $Y_2$), add Delta X and Delta Y to the starting point and calculate what the range would be for the possible ending point using this equation:

Calculated_Range=square root $((X+\text{Delta } X)^2+(Y+\text{Delta } Y)^2)$

2) If Calculated Range is the same as the measured Range 2, then $X_E$=X+Delta X and $Y_E$=Y+Delta Y. If not equal, choose the second point of intersection between the EPE circle and the Range 1 Arc and re-calculate a new Calculated Range with the equation from step 1.
3) If Calculated Range is the same as the measured Range 2, then $X_E$=X+Delta X and $Y_E$=Y+Delta Y. If not equal, then perform a binary search of all possible points which are inside of the EPE circle and are Range 1 away from the ranging site.

No other ending point in space will solve these equations.

It is important to note that the resulting coordinates ($X_E$ and $Y_E$) are only as accurate as the accuracy of the range measurements (Range 1 and Range 2) and the movement measurements (Delta X and Delta Y). Any inaccuracies in these measurements will result in an uncertainty in the ending position of the device (as shown in FIG. 2 as the reduced error). Further, it should be noted that above discussion assumed a two-dimensional system, however, the present invention is applicable to three-dimensional systems as well. As will be obvious to those skilled in the art, if a three-dimensional system is used, the EPE circle 104 would be an EPE sphere and a z-coordinate will also be provided in the varying sets of coordinates.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method comprising the steps of:
measuring a first set of coordinates of a device;
measuring an estimated positional error ("EPE") radius for the first set of coordinates;
deriving an EPE circle representing a two-dimensional Cartesian plane, in which the device is approximately located, from the first set of coordinates and the EPE radius;
determining that the EPE radius exceeds a predetermined threshold;
measuring a first range between the device and a single ranging site; and
determining a locus of points within the EPE circle, the locus of points representing a three-dimensional spherical coordinate system having an origin at a site intersecting the two-dimensional Cartesian plane, wherein a distance between the single ranging site and each point in the locus of points approximately equals the first range, the locus of points providing reduced position uncertainty for the device.

2. The method of claim 1 wherein at least one of the steps of measuring a first set of coordinates of a device and measuring an EPE radius for the first set of coordinates is as reported by the device.

3. The method of claim 1 wherein the first set of coordinate is the center of the EPE circle.

4. The method of claim 1 wherein the predetermined threshold is based on a positional resolution.

5. The method of claim 1 wherein the EPE radius is derived from a confidence factor as reported by the device.

6. The method of claim 1 wherein the locus of points includes at least one point located on the EPE circle, wherein a distance between the single ranging site and the at least one point on the EPE circle equals the first range.

7. The method of claim 6 further comprising the steps of:
determining that the device has moved its location;
measuring a second set of coordinates of the device;
deriving a delta set of coordinates by comparing the first set of coordinates with the second set of coordinates;
measuring a second range between the device and the single ranging site;
adding the delta set of coordinates to at least one point in the locus of points until a distance between a resultant point and the single ranging site approximately equals the second range; and
determining that the device is approximately located at the resultant point.

8. The method of claim 7 wherein the step of adding the delta set of coordinates is performed in one of the following fashions: a binary search, a sequential search, and a random search.

9. The method of claim 7 wherein the first set of coordinates, the second set of coordinates, and the delta set of coordinates are two-dimensional coordinates.

10. The method of claim 7 wherein the step of measuring a second set of coordinates of the device is as reported by the device.

11. A method comprising the steps of:
measuring a first set of coordinates of a device;
measuring an estimated positional error ("EPE") radius for the first set of coordinates;
deriving an EPE sphere, in which the device is approximately located, from the first set of coordinates and the EPE radius;
determining that the EPE radius exceeds a predetermined threshold;
measuring a first range between the device and a single ranging site; and
determining a locus of points within the EPE sphere, wherein a distance between the single ranging site and each point in the locus of points approximately equals the first range.

12. The method of claim 11 wherein at least one of the steps of measuring a first set of coordinates of a device and measuring an EPE radius for the first set of coordinates is as reported by the device.

13. The method of claim 11 wherein the first set of coordinate is the center of the EPE sphere.

14. The method of claim 11 wherein the predetermined threshold is based on a positional resolution.

15. The method of claim 11 wherein the EPE radius is derived from a confidence factor as reported by the device.

16. The method of claim 11 wherein the locus of points includes at least one point located on the EPE sphere, wherein a distance between the single ranging site and the at least one point on the EPE sphere equals the first range.

17. The method of claim 11 further comprising the steps of:
determining that the device has moved its location;
measuring a second set of coordinates of the device;
deriving a delta set of coordinates by comparing the first set of coordinates with the second set of coordinates;
measuring a second range between the device and the single ranging site;
adding the delta set of coordinates to at least one point in the locus of points until a distance between a resultant point and the single ranging site approximately equals the second range; and
determining that the device is approximately located at the resultant point.

18. The method of claim 17 wherein the step of adding the delta set of coordinates is performed in one of the following fashions: a binary search, a sequential search, and a random search.

19. The method of claim 17 wherein the first set of coordinates, the second set of coordinates, and the delta set of coordinates are three-dimensional coordinates.

20. The method of claim 17 wherein the step of measuring a second set of coordinates of the device is as reported by the device.

21. A method comprising the steps of:

measuring a first set of coordinates of a device;

measuring an estimated positional error ("EPE") radius for the first set of coordinates;

deriving an EPE circle, in which the device is approximately located, from the first set of coordinates and the EPE radius;

determining that the EPE radius exceeds a predetermined threshold;

measuring a first range between the device and a ranging site; and determining a locus of points within the EPE circle, wherein a distance between the ranging site and each point in the locus of points approximately equals the first range;

determining that the device has moved its location;

measuring a second set of coordinates of the device;

deriving a delta set of coordinates by comparing the first set of coordinates with the second set of coordinates;

measuring a second range between the device and the ranging site;

adding the delta set of coordinates to at least one point in the locus of points until a distance between a resultant point and the ranging site approximately equals the second range; and determining that the device is approximately located at the resultant point.

22. The method of claim 21 wherein at least one of the steps of measuring a first set of coordinates of a device and measuring an EPE radius for the first set of coordinates is as reported by the device.

23. The method of claim 21 wherein the first set of coordinate is the center of the EPE circle.

24. The method of claim 21 wherein the predetermined threshold is based on a positional resolution.

25. The method of claim 21 wherein the EPE radius is derived from a confidence factor as reported by the device.

26. The method of claim 21 wherein the locus of points includes at least one point located on the EPE circle, wherein a distance between the ranging site and the at least one point on the EPE circle equals the first range.

27. The method of claim 21 wherein the step of adding the delta set of coordinates is performed in one of the following fashions: a binary search, a sequential search, and a random search.

28. The method of claim 21 wherein the first set of coordinates, the second set of coordinates, and the delta set of coordinates are two-dimensional coordinates.

29. The method of claim 21 wherein the step of measuring a second set of coordinates of the device is as reported by the device.

* * * * *